United States Patent
Ichino et al.

(10) Patent No.: US 11,709,457 B2
(45) Date of Patent: Jul. 25, 2023

(54) APPARATUS THAT USES ULTRASONIC SENSOR FOR PLURALITY OF PURPOSES

(71) Applicant: CANON KABUSHIKI KAISHA, Tokyo (JP)

(72) Inventors: Toshiyuki Ichino, Shizuoka (JP); Naoki Nishimura, Shizuoka (JP); Hiromitsu Kumada, Shizuoka (JP); Masafumi Monde, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 164 days.

(21) Appl. No.: 17/317,355

(22) Filed: May 11, 2021

(65) Prior Publication Data

US 2021/0364985 A1   Nov. 25, 2021

(30) Foreign Application Priority Data

May 25, 2020  (JP) .................. 2020-090825

(51) Int. Cl.
| | |
|---|---|
| *G03G 21/20* | (2006.01) |
| *G01K 3/08* | (2006.01) |
| *G01K 3/00* | (2006.01) |
| *G01B 17/02* | (2006.01) |
| *G01L 11/06* | (2006.01) |

(52) U.S. Cl.
CPC .............. *G03G 21/20* (2013.01); *G01B 17/02* (2013.01); *G01K 3/005* (2013.01); *G01K 3/08* (2013.01); *G01L 11/06* (2013.01)

(58) Field of Classification Search
CPC .. G03G 15/703; G03G 15/5029; G03G 21/20; G03G 2215/00738; G03G 2215/00742; G03G 2215/00751; G01B 17/02
See application file for complete search history.

(56) References Cited

U.S. PATENT DOCUMENTS

| | | | |
|---|---|---|---|
| 9,429,892 B2 * | 8/2016 | Watanabe | .......... G03G 15/5029 |
| 9,450,493 B2 | 9/2016 | Nagasaki | |
| 9,983,530 B2 | 5/2018 | Namiki | |
| 10,458,913 B2 | 10/2019 | Namiki | |
| 10,684,218 B2 | 6/2020 | Ishimoto | |
| 11,035,787 B2 | 6/2021 | Ishimoto | |
| 2019/0376891 A1 | 12/2019 | Namiki | |

(Continued)

FOREIGN PATENT DOCUMENTS

| | | | |
|---|---|---|---|
| JP | 2004-107030 A | | 4/2004 |
| JP | 2017-39589 A | | 2/2017 |
| JP | 2020034667 A | * | 3/2020 |

OTHER PUBLICATIONS

Kawaoka, JP 2020-034667 A, Mar. 2020, WIPO Machine Translation (Year: 2020).*

*Primary Examiner* — Erika J. Villaluna
(74) *Attorney, Agent, or Firm* — Venable LLP

(57) ABSTRACT

An image forming apparatus comprises an ultrasonic sensor and a processor is configured to control the image forming apparatus based on an output signal of the ultrasonic sensor. The processor estimates a barometric pressure based on the output signal of the ultrasonic sensor and determines an image forming condition based on the estimated barometric pressure. The ultrasonic sensor is utilized for controlling the image forming apparatus and for estimating the barometric pressure.

15 Claims, 8 Drawing Sheets

(56) References Cited

U.S. PATENT DOCUMENTS

| | | |
|---|---|---|
| 2020/0319584 A1 | 10/2020 | Monde |
| 2021/0241058 A1 | 8/2021 | Suzuki |
| 2021/0262926 A1 | 8/2021 | Ishimoto |

* cited by examiner

APPARATUS THAT USES ULTRASONIC SENSOR FOR PLURALITY OF PURPOSES

BACKGROUND OF THE INVENTION

Field of the Invention

The present invention relates to a device that uses an ultrasonic sensor for a plurality of purposes.

Description of the Related Art

Image forming apparatuses control image forming conditions in accordance with the type of sheet. Japanese Patent Laid-Open No. 2004-107030 proposes detecting the grammage of a sheet using an ultrasonic sensor. Sound waves have a property that the difficulty of transmission (acoustic impedance) changes depending on the density of air. Accordingly, the reception level of sound waves is affected by the barometric pressure of the installation location of the ultrasonic sensor. Japanese Patent Laid-Open No. 2017-039589 proposes estimating barometric pressure using an ultrasonic sensor and then setting a threshold for discriminating double feeding of sheets using the estimated barometric pressure.

In order to determine image forming conditions using barometric pressure, it is necessary to accurately acquire the barometric pressure. However, accurate barometers are expensive; therefore, it is necessary to be able to accurately acquire barometric pressure using a relatively inexpensive configuration.

SUMMARY OF THE INVENTION

The present invention provides an image forming apparatus which may comprise an ultrasonic sensor and a processor is configured to control the image forming apparatus based on an output signal of the ultrasonic sensor. The processor may estimate a barometric pressure based on the output signal of the ultrasonic sensor and determine an image forming condition based on the estimated barometric pressure. The ultrasonic sensor may be utilized for controlling the image forming apparatus and for estimating the barometric pressure.

Further features of the present invention will become apparent from the following description of exemplary embodiments (with reference to the attached drawings).

DESCRIPTION OF THE EMBODIMENTS

Figure 1:
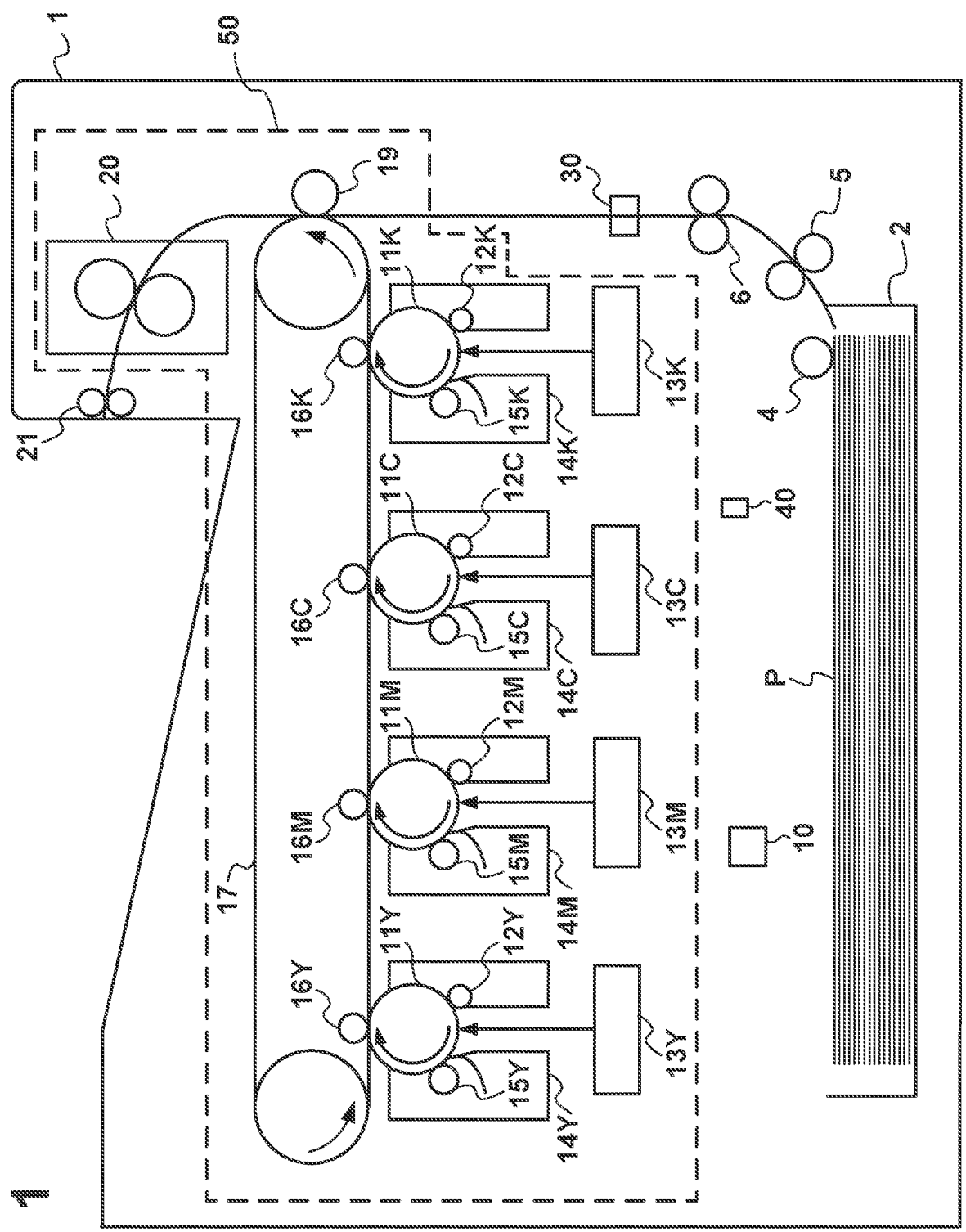
FIG. 1 is a view illustrating an image forming apparatus, which is an example of electronic equipment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

[Image Forming Apparatus]

As illustrated in FIG. 1, an image forming apparatus 1 is an electrographic image forming apparatus that forms a full color image onto a sheet P using an intermediate transfer belt 17. An image forming unit 50 forms color images by overlaying toner of four colors such as yellow (Y), magenta (M), cyan (C), and black (K). Note that the letters, Y, M, C, and K, added to the ends of reference numerals indicate the color of toner, and when matters common to the four colors are described, the letters, Y, M, C, and K, will be omitted.

A photosensitive drum 11 is a photosensitive member and an image carrying member that carries an electrostatic latent images and a toner image. A charging roller 12 charges the surface of the photosensitive drum 11 so that the surface potential of the photosensitive drum 11 will be of a uniform potential. An exposure device 13 forms an electrostatic latent image by scanning over the photosensitive drum 11 using light that corresponds to image data. A toner cartridge 14 is a process cartridge that stores toner. A developing roller 15 forms a toner image by developing the electrostatic latent image using toner. A primary transfer roller 16 transfers the toner image onto the intermediate transfer belt 17 from the photosensitive drum 11. A full color image is formed by sequentially overlaying and transferring toner images of four colors onto the intermediate transfer belt 17. The intermediate transfer belt 17 conveys the toner images to a secondary transfer roller 19.

A sheet feeding cassette 2 is a container that stores a plurality of sheets P. A sheet feeding roller 4 picks up and then feeds to a conveyance path a sheet P. In the conveyance path, conveyance rollers 5 and registration rollers 6 are disposed. The conveyance rollers 5 and the registration rollers 6 convey the sheet P to the secondary transfer roller 19.

The secondary transfer roller 19 transfers the toner image onto the sheets P from the intermediate transfer belt 17. A fixer 20 fixes the toner image onto the sheet P by adding heat and pressure to the sheet P and the toner image while conveying the sheet P. Sheet discharge rollers 21 discharge the sheet P on which fixation has been performed by the fixer 20.

A temperature sensor 40 detects the outside air temperature of the image forming apparatus 1. A sheet discrimination device 30 is a media sensor that detects the type (e.g., grammage) of the sheet P. A control unit 10 is a print substrate that incorporates a control circuit that controls image forming conditions in accordance with the type of sheet P and a processor circuit. The processor circuit realizes various functions by executing computer programs. The functions described below may be realized by a hardware circuit such as an ASIC (application specific integrated circuit) or an FPGA (field-programmable gate array).

Here, the relationship between sheet types and image forming conditions (e.g., secondary transfer conditions and fixing conditions) are as follows. Typically, a resistance value of the sheet P changes depending on the grammage of the sheet P. Accordingly, the control unit 10 controls secondary transfer conditions for transferring toner in accordance with grammage (sheet type). A heat capacity of the sheet P is different depending on the grammage of the sheet P. Accordingly, the control unit 10 controls fixing conditions such as a fixing temperature and a fixing period for fixing the toner and a conveyance speed in accordance to grammage (sheet type). As described above, appropriate image forming conditions are different in accordance with the sheet type (grammage); therefore, the control unit 10 sets image forming conditions in accordance with the sheet type discriminated by the sheet discrimination device 30.

[Sheet Discrimination Device]

Figure 2:
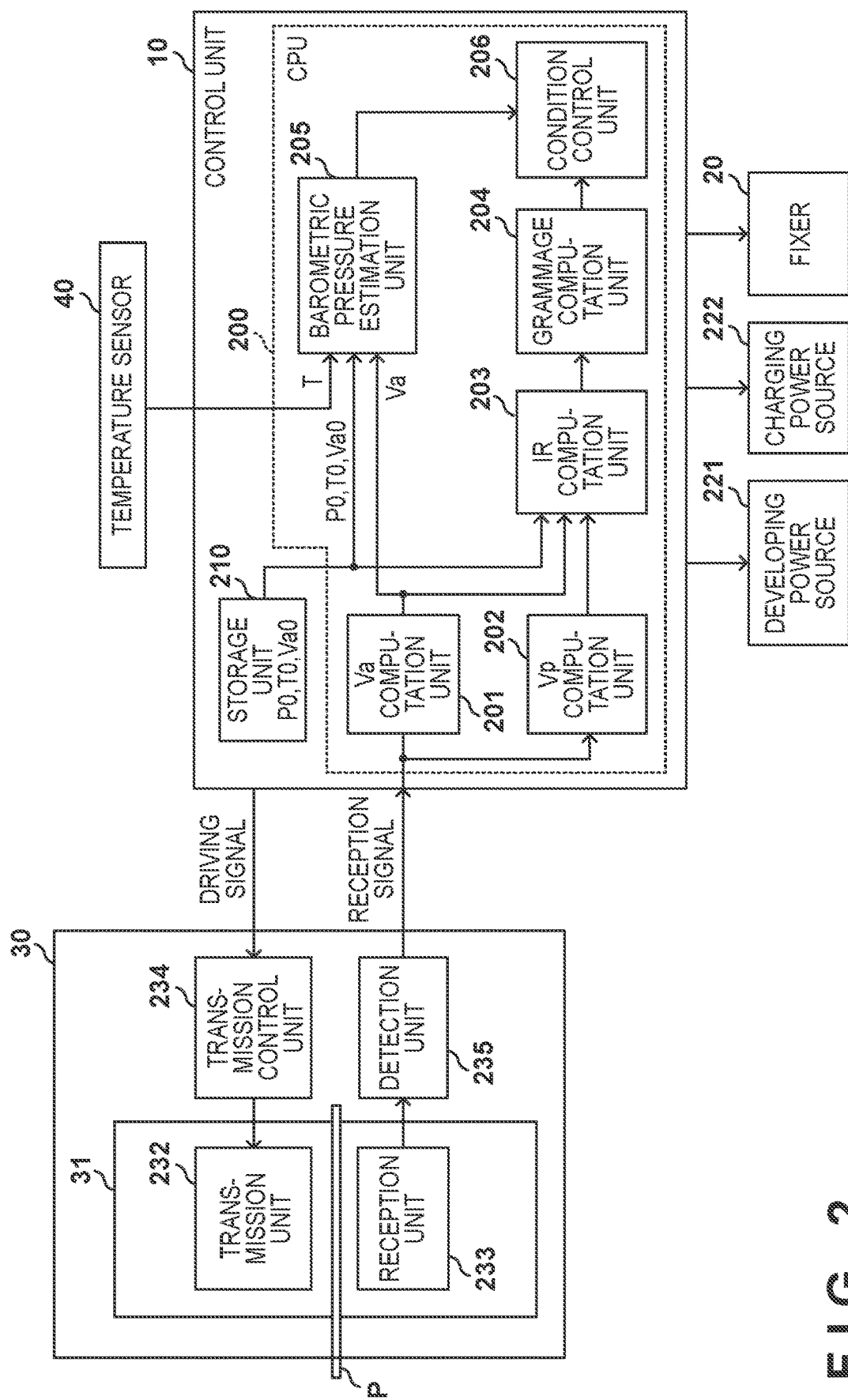
FIG. 2 is a view illustrating a sheet determination device.

FIG. 2 illustrates the sheet discrimination device 30 and the control unit 10. The sheet discrimination device 30 has an ultrasonic sensor 31, a transmission control unit 234, and a detection unit 235. The ultrasonic sensor 31 is used as a sensor that detects grammage. The ultrasonic sensor 31 has a transmission unit 232 and a reception unit 233. The transmission unit 232 has an ultrasonic element that transmits ultrasonic waves. The reception unit 233 has an ultrasonic element that receives ultrasonic waves. The transmission unit 232 transmits sound waves of a frequency (e.g., 40 kHz) that accords with a driving signal inputted from the transmission control unit 234. The reception unit 233 receives the sound waves transmitted from the transmission unit 232 and then outputs to the detection unit 235 a reception signal that accords with the sound pressure of the received sound wave. In the first embodiment, the frequency of sound waves is assumed to be 40 kHz; however, this is merely an example. The frequency may be of any frequency so long as a characteristic value of the grammage of the sheet P is detectable.

The transmission unit 232 and the reception unit 233 are disposed in the vicinity of the conveyance path of the sheet P so as to be able to transmit/receive sound waves via the sheet P. The transmission control unit 234 has an amplification circuit that amplifies the driving signal from the control unit 10 and then drives the transmission unit 232. The transmission control unit 234 may have an oscillation circuit that generates and then supplies to the transmission unit 232 a pulse signal that accords with the driving signal from the control unit 10. The detection unit 235 has an amplification circuit that amplifies a detection signal outputted from the reception unit 233 and a rectification circuit that performs half-wave rectification on the amplified detection signal and then generates a reception signal. The reception signal generated by the detection unit 235 is inputted into an AD port of a CPU 200 of the control unit 10. AD refers to analog-to-digital conversion. The AD port includes an AD conversion circuit that samples and then converts the inputted analog signal into a digital value.

The control unit 10 has the CPU 200 and a storage unit 210. The storage unit 210 has a ROM (read-only memory) region and a RAM (random access memory) region. The CPU 200 realizes various functions by executing control programs stored in the ROM region of the storage unit 210. In particular, the CPU 200 generates the driving signal for driving the ultrasonic sensor 31, computes the grammage of the sheet P based on the reception signal inputted into the AD port, and estimates barometric pressure.

The CPU 200 extracts as the reception level a peak value of the reception signal based on the digital value acquired by converting the reception signal in the AD port. Instead of the peak value, a characteristic value (e.g., an effective value or an average value) that relates to the level of reception signal may be employed.

A Va computation unit 201 computes a reception level Va of the reception signal acquired by the ultrasonic sensor 31 without having gone through the sheet P. "Without having gone through the sheet P" means that there is no sheet P between the transmission unit 232 and the reception unit 233. A Vp computation unit 202 computes a reception level Vp of the reception signal acquired by the ultrasonic sensor 31 having gone through the sheet P. An IR computation unit 203 computes an IR value. The IR value is a parameter (evaluation value) used for grammage computation. Details of the IR value will be described later. A grammage computation unit 204 computes the grammage of the sheet P using the IR value. A condition control unit 206 controls image forming conditions (e.g., fixing conditions) based on grammage and controls image forming conditions (e.g., charging conditions and developing conditions) based on barometric pressure. An already known method may be used as a method of controlling image forming conditions based on grammage. A barometric pressure estimation unit 205 estimates barometric pressure based on a temperature Ta acquired by the temperature sensor 40 and reference parameters and the reception level Va stored in the storage unit 210.

A developing power source 221 is a power supply circuit that generates a developing voltage (developing bias) applied to the developing roller 15 for promoting developing. A charging power source 222 is a power supply circuit that generates a charging voltage (charging bias) applied to the charging roller 12 for charging the photosensitive drum 11. The fixer 20 has a heater and controls the heater so as to be able to attain a fixing temperature determined in accordance with grammage.

[Time Chart]

Figure 3:
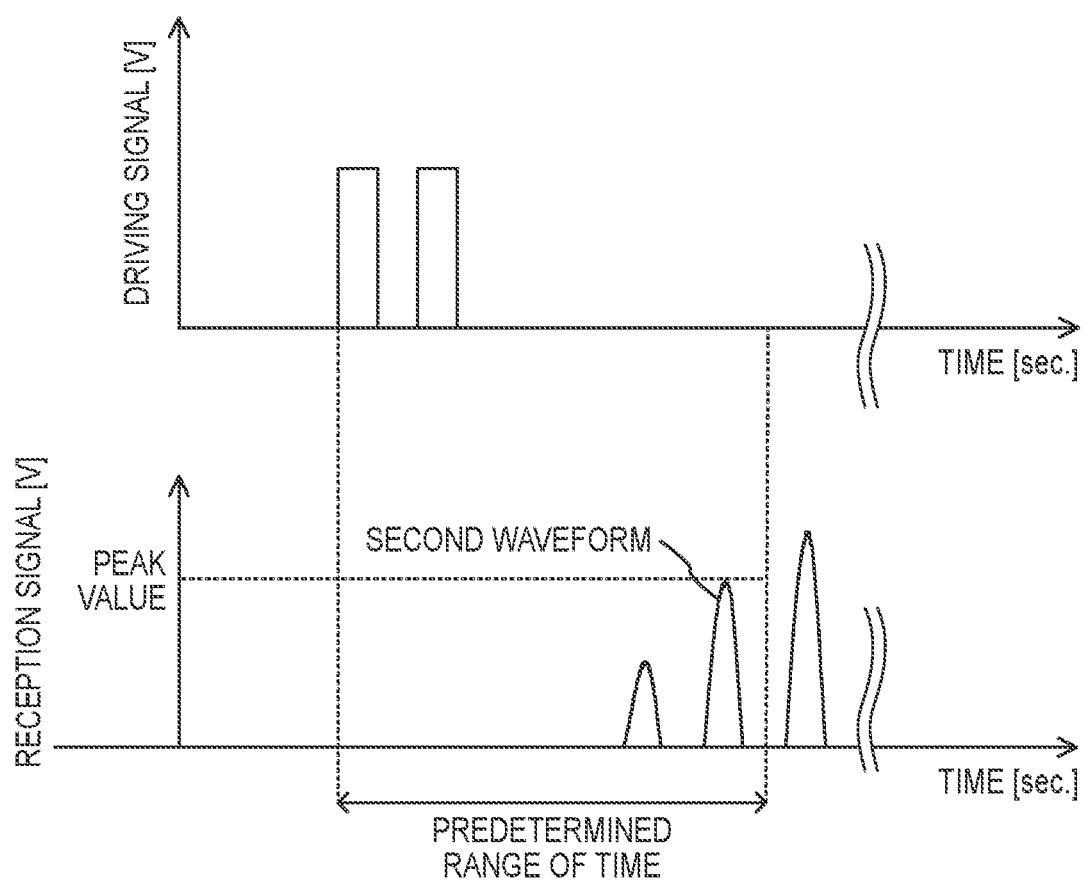
FIG. 3 is a view illustrating a driving signal and a reception signal.

FIG. 3 illustrates the relationship of the driving signal and the reception signal. The vertical axes represent the level of the driving signal and the level of the reception signal. The horizontal axes represent time. The driving signal is a pulse wave (burst wave) of a fixed cycle. For example, the frequency is 40 kHz. The number of pulses is two pulses. The reception level of the reception signal generated in the detection unit 235 correlates to the sound pressure of sound waves received by the reception unit 233. The reception signal has a peak value every half wave of 40 kHz, which is the same as the frequency of the sound waves of the transmission unit 232. The number of pulses of the driving signal is two pulses; however, the number of waveforms of the reception signal exceeds two. This is because an echo is generated in the transmission unit 232 or the reception unit 233. The control unit 10 detects the second waveform on the time axis among a plurality of waveforms and then extracts the peak value thereof. The Va computation unit and the Vp computation unit acquires the peak value (reception level Va or Vb) of the second waveform by detecting the reception signal in a desired predetermined range of time (detection window) that is synchronous with the driving signal. As illustrated in FIG. 3, a starting point of the predetermined range of time may be a timing when an output of the driving signal was started. The width (length) of the predetermined range of time is calculated in advance from the relationship between the distance between the transmission unit 232 and the reception unit 233 and the speed of ultrasonic waves and then is set.

The control unit 10, in a period that the sheet P is being conveyed between the transmission unit 232 and the reception unit 233, transmits the driving signal to the transmission control unit 234 and then sequentially extracts a plurality of peak values. The reception level Vp for when the ultrasonic waves are received via the sheet P changes mainly depending on the grammage of the sheet P. Accordingly, the control unit 10 detects the grammage of the sheet P by using the change in the reception level Vp caused by the sheet P.

[Correcting Detection Result]

Positional Variability

The positional relationship of the reception unit 233 and the transmission unit 232 is varied in relation to the relationship envisioned in the design. This variability occurs in the process of manufacturing the ultrasonic sensor 31 or in the process of attaching the ultrasonic sensor 31 onto the image forming apparatus 1. This variability leads to the variability in the reception levels of ultrasonic waves. Accordingly, the IR computation unit 203 computes a position correction coefficient I based on the reception level Va when there is no sheet P and the reception level Vp when there is a sheet P.

$$I=Vp/Va \quad (1)$$

Environmental Variability

The detection result of grammage varies in accordance with the surrounding environment (e.g., barometric pressure and temperature) of the ultrasonic sensor 31. By air expanding or shrinking depending on barometric pressure or temperature, the density of air changes. Typically, the lower the density of air, the harder it is for ultrasonic waves to be transmitted. Conversely, the greater the density of air, the easier it is for ultrasonic waves to be transmitted. In other words, the difficulty of transmitting sound (acoustic impedance of the surrounding environment) changes depending on the surrounding environment.

Figure 4A:
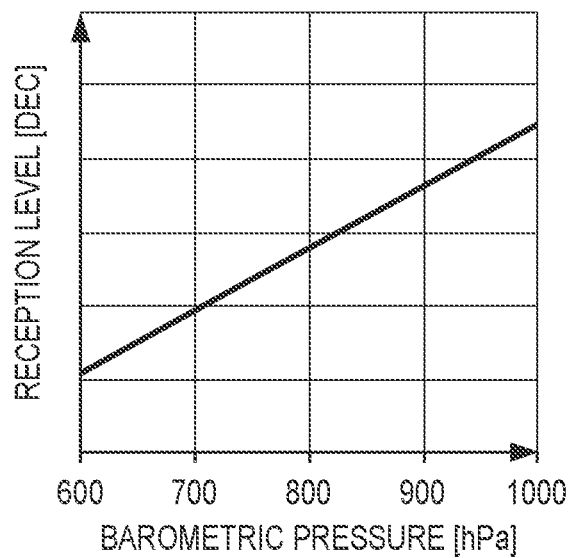
FIGS. 4A and 4B are views illustrating reception levels related to barometric pressure and temperature.
Figure 4B:
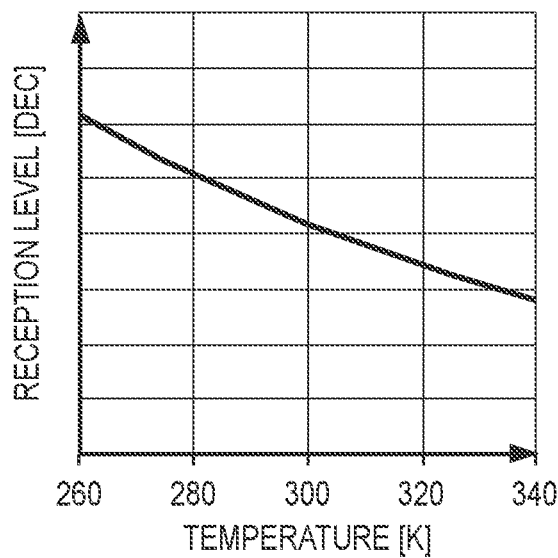

FIG. 4A is a graph illustrating the relationship of barometric pressure and the reception level. The vertical axis represents the reception level. The horizontal axis represents barometric pressure. The density of air decreases as barometric pressure decreases; therefore, the reception level decreases. FIG. 4B is a graph illustrating the relationship of temperature and the reception level. The vertical axis represents the reception level. The horizontal axis represents temperature. The density of air decreases as temperature increases; therefore, the reception level decreases. As described above, the reception level of the ultrasonic sensor 31 varies depending on the change in acoustic impedance due to barometric pressure and temperature.

A reference environment parameter may be acquired at the time of factory shipping and the like. Here, a reference barometric pressure A0 and a reference temperature T0 are measured at the time of factory shipping of the image forming apparatus 1 and then are stored in the ROM region of the storage unit 210. Also, a reference reception level Va0, which is a reception level of when the sheet P is not passing through the ultrasonic sensor 31, is also measured and then stored in the storage unit 210. The IR computation unit 203, computes an environment correction coefficient R based on the reference reception level Va0 and the reception level Va acquired immediately before performing detection of the grammage of the sheet P.

$$R=Va0/Va \quad (2)$$

The IR computation unit 203 reduces the effect that positional variability and environmental variability has on the detection accuracy by computing the position correction coefficient I and the environment correction coefficient R. The IR computation unit 203 computes the IR value by multiplying the position correction coefficient I and the environment correction coefficient R.

$$IR=I\times R \quad (3)$$

Figure 5:
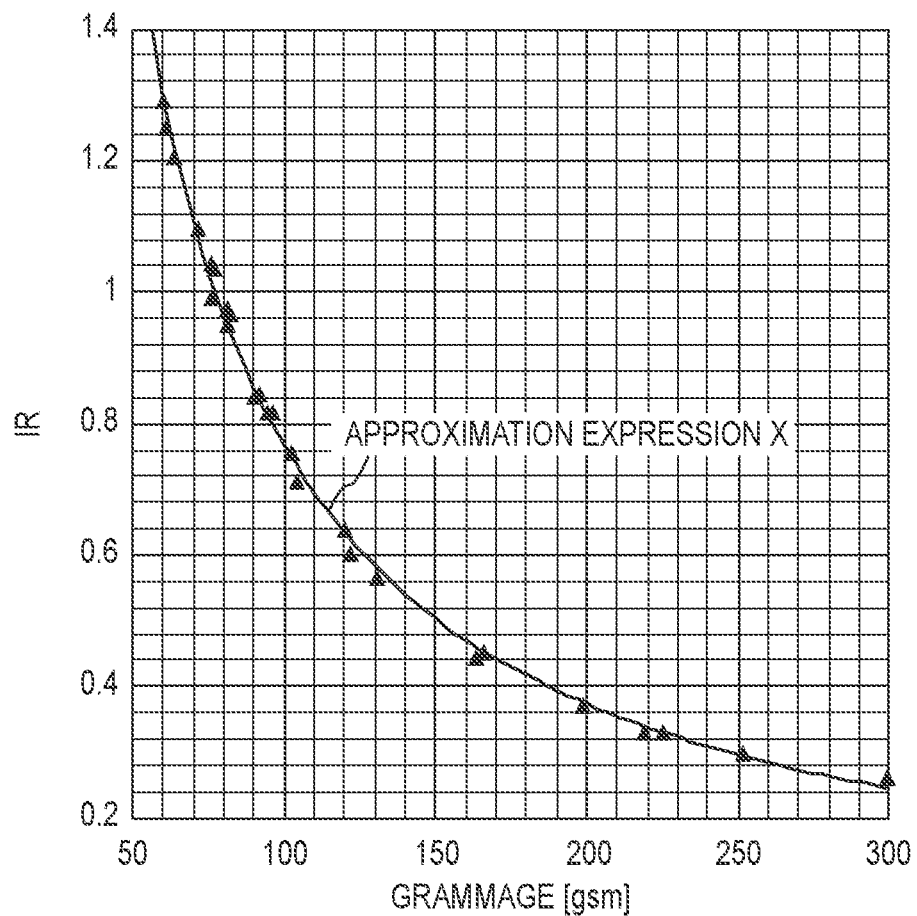
FIG. 5 is a view illustrating an evaluation value (IR value) related to grammage.

FIG. 5 illustrates the relationship between the measured value of grammage acquired by measuring 26 types of sheets P using an electronic scale and the IR value computed using expression (3). The vertical axis represents the IR value. The horizontal axis represents grammage. The IR value decreases as the grammage of the sheet P increases. This is because the amount of attenuation of ultrasonic waves that pass through the sheet P increases as grammage increases. The grammage computation unit 204 computes a grammage G of the sheet P from the IR value by using an approximate expression X, which represents the relationship between grammage and the IR value illustrated in FIG. 5.

$$G=X(IR) \quad (4)$$

Furthermore, the condition control unit 206 determines an image forming condition (e.g., a fixing temperature or a conveyance speed) U based on the grammage G.

$$U=V(G) \quad (5)$$

Here, a function V is an expression for computing a fixing condition related to grammage. The function V is determined by executing an experiment or a simulation in relation to various grammages at the time of factory shipping of the image forming apparatus 1. The function V may be a table holding the relationship between grammages and fixing conditions. The function V or the table is stored in the storage unit 210.

[Method of Computing Barometric Pressure]

As described above, the storage unit 210 stores the reference barometric pressure A0, the reference temperature T0, and the reference reception level Va0. Meanwhile, the temperature sensor 40 incorporated in the image forming apparatus 1 detects the temperature T inside the image forming apparatus 1.

As FIG. 4B illustrates, when the temperature of the surrounding of the ultrasonic sensor 31 changes, the reception level thereof also changes. When the temperature sensor 40 is placed near the ultrasonic sensor 31, the barometric pressure A is accurately acquired using the temperature T. Note that when a dedicated temperature sensor is provided in relation to the ultrasonic sensor 31, it leads to an increase in the cost of the image forming apparatus 1. Accordingly, if the temperature sensor incorporated in the image forming apparatus 1 for another purpose can be used, an inexpensive barometric pressure estimation apparatus is realized. As described above, by making it also possible for the temperature sensor, in addition to the ultrasonic sensor 31, to be utilized for other purposes, a more inexpensive barometric pressure estimation apparatus is realized.

In the first embodiment, the temperature sensor 40 is placed for the purpose of detecting the outside air temperature of the image forming apparatus 1. However, the temperature sensor comprised in the image forming apparatus 1 for another purpose may be used. For example, the fixation temperature sensor which is near a ceramic heater constituting the fixer 20 and is comprised for the purpose of controlling power supply so as to maintain the ceramic heater at a desired temperature may be used. The temperature sensor disposed near the exposure device 13 may be used. Mold materials that hold members such as lenses and mirrors constituting the exposure device 13 thermally deform. Thermal deformation leads to a change in the illumination position of laser light of the exposure device 13. Accordingly, the CPU 200, in response to the detection result of this temperature sensor, corrects the illumination position of laser light by controlling the timing of emitting the laser light.

In a case where the temperature sensor 40 is not disposed near the ultrasonic sensor 31, it is necessary that the temperature is measured under a condition in which the temperature of the ultrasonic sensor 31 and the temperature of the temperature sensor 40 coincide. For example, that a fixed amount of time has elapsed from when an image forming operation has ended may be a condition. This is because when a fixed amount of time elapses, the temperature of the ultrasonic sensor 31 and the measured temperature of the temperature sensor 40 substantially coincide.

At the installation location of the image forming apparatus 1, the control unit 10 may acquire the reception level Va for when there is no sheet P immediately before performing detection of the grammage of the sheet P. Here, immediately before refers to a period from a timing when the sheet feeding roller 4 has started feeding the sheet P until the leading edge of the sheet P arrives at the ultrasonic sensor 31.

The barometric pressure estimation unit 205 computes the barometric pressure A from the reference barometric pressure A0, the reference temperature T0, the reference reception level Va0, and the reception level Va and the temperature T at the installation location of the image forming apparatus 1. The reference barometric pressure A0, the reference temperature T0, and the reference reception level Va0 are read out from the storage unit 210. The barometric pressure A, for example, may be computed from the following expression.

$$A=A0\times(Va/Va0)\times((T\times T0.5)/(T0\times T00.5)) \qquad (6)$$

[Image Forming Conditions that Accord with Barometric Pressure]

Developing Voltage

In a case where a jumping method has been adopted as a developing method, a gap is provided between the photosensitive drum 11 and the developing roller 15. By applying onto the developing roller 15 a developing voltage generated by the developing power source 221 overlaying a direct current and an alternating current, an electric field for developing is generated in the gap. Sinusoidal waves, triangular waves, rectangular waves, or the like are adopted as the AC voltage. The peak value of the developing voltage for forming the electric field that biases the toner in a direction toward the photosensitive drum 11 from the developing roller 15 is called Vmax. The peak value of the developing voltage for forming the electric field that biases the toner in a direction toward the developing roller 15 from the photosensitive drum 11 is called Vmin.

Image quality improvement is realized, for example, by increasing the maximum image density. The maximum image density is the maximum density of a toner image corresponding to the maximum density (tone) that each pixel may take on in image data. In order to increase image density, more toner on the developing roller 15 may be transferred onto the photosensitive drum 11. As one method thereof, a method of increasing Vmax is already known. However, if Vmax is increased, there is a higher possibility that leakage will occur between the photosensitive drum 11 and the developing roller 15. Damage may be caused on the photosensitive drum 11 or the developing roller 15 due to this leakage.

Particularly in highlands with low barometric pressure, the limit value at which leakage occurs is lower when compared to lowlands. Meanwhile, in lowlands, the limit value becomes relatively high. The image forming apparatus 1 must be able to accurately form images regardless of whether it is in a highland or a lowland. Accordingly, the value of Vmax is determined so as to be the limit value or less determined envisioning being in a highland. This means bearing limitations due to the limit value for the highlands in spite of the fact that Vmax can be set higher in lowlands. Accordingly, it was difficult to achieve image quality improvement in both the lowlands and highlands.

If, hypothetically, the barometric pressure A at the installation location of the image forming apparatus 1 can be accurately acquired, a developing voltage suitable for the installation location thereof can be determined based on the barometric pressure A. In other words, it becomes possible to set, in accordance to each installation location, a developing voltage that can achieve image quality improvement without causing leakage.

$$V\max=Y(A) \qquad (7)$$

Here, the function Y is an equation that represents the relationship between various barometric pressures A and Vmax and is stored in the ROM region of the storage unit 210 in advance and is used by the CPU 200.

Charging Voltage

Regarding the photosensitive drum 11, a direct-current charging voltage (charging bias) Vd is applied from the charging power source 222 of the image forming apparatus 1 onto the charging roller 12 that is in contact with the photosensitive drum 11. By this, the surface potential of the photosensitive drum 11 becomes VD. A surface potential VD of the photosensitive drum 11 is affected by a discharge start voltage Vs.

$$VD=Vd-Vs \qquad (8)$$

According to Paschen's law, the lower the barometric pressure becomes, the lower the discharge start voltage Vs becomes. Accordingly, due to the effect of barometric pressure in the installation location of the image forming apparatus 1, there was variability in the surface potential VD. Accordingly, it was difficult to achieve high image quality in both the lowlands and highlands.

If the barometric pressure A in the installation location of the image forming apparatus 1 can be accurately acquired, the charging voltage Vd can be appropriately set based on the barometric pressure A. By this, it becomes possible to stabilize the surface potential VD in various installation locations, and high-quality images can be obtained.

$$Vd=Z(A) \qquad (9)$$

Here, the function Z is an equation that represents the relationship between various barometric pressures A and the charging voltage Vd and is stored in the ROM region of the storage unit 210 in advance and is used by the CPU 200.

[Flowchart]

Figure 6:
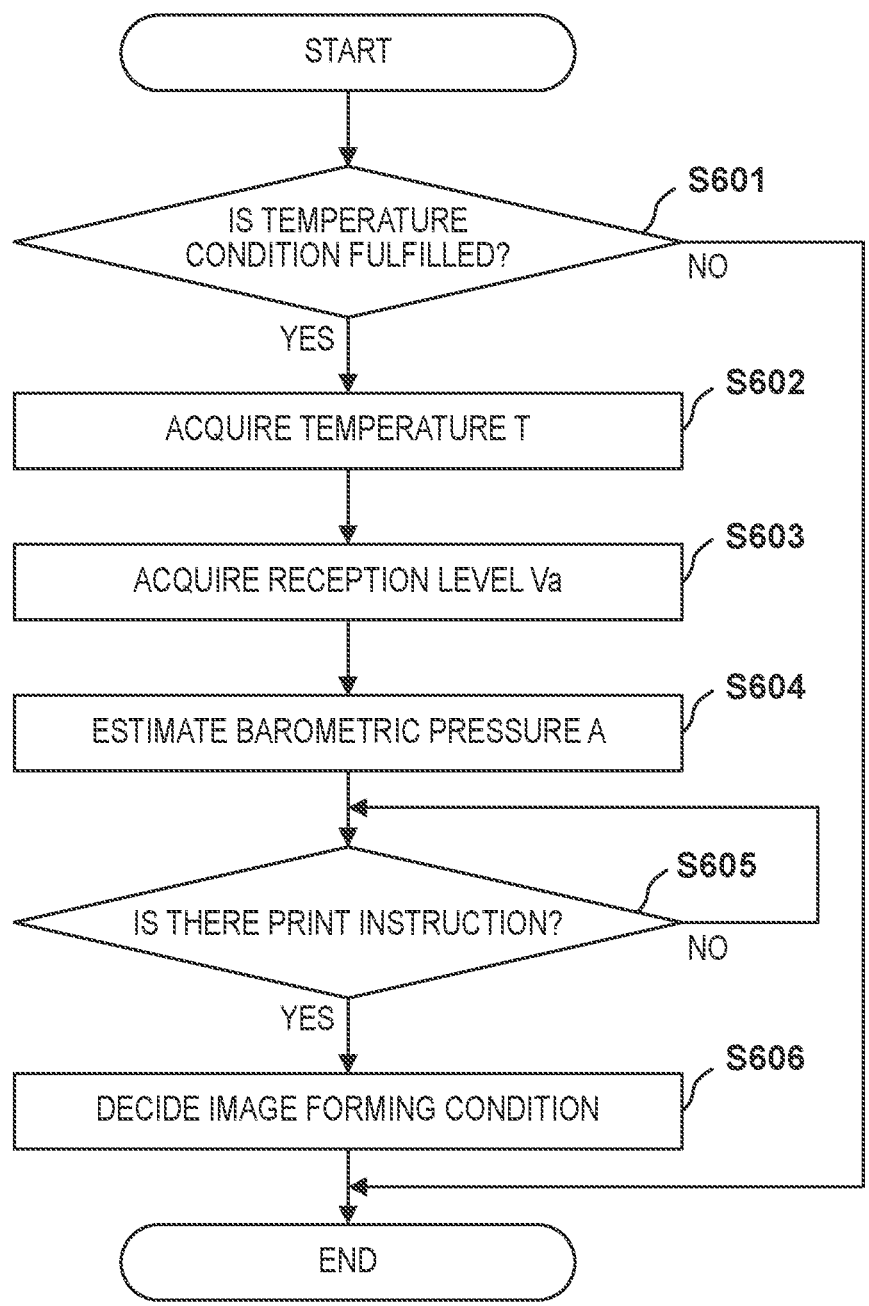
FIG. 6 is a flowchart illustrating a method of estimating barometric pressure.

FIG. 6 is a flowchart illustrating a method of controlling image forming conditions including barometric pressure computation processing that the CPU 200 executes. When the power of the image forming apparatus 1 is turned on, the CPU 200 executes the following processing.

In step S601, the CPU 200 determines whether a temperature condition is fulfilled. The temperature condition is a condition in which acquisition of the temperature T is permitted. The temperature condition is, for example, a condition in which the temperature of the ultrasonic sensor 31 and the temperature of the temperature sensor 40 substantially coincide. It is not necessary that the two completely coincide, and it is sufficient if the absolute value of the difference between the two is a predetermined threshold or less. For example, the temperature condition may be that a predetermined period of time has elapsed from a timing when previous image formation was ended. The CPU 200 may reference image formation history that is stored in the RAM region of the storage unit 210 and then acquire a timing when previous image formation was ended. Also, the predetermined period of time is stored in the storage unit 210 and is read out by the CPU 200 and then used. Alternatively, in a case where the number of sheets for which image formation was performed in a previous print job is small, the predetermined period of time may be set to be relatively short. In a case where the number of sheets for which image formation was performed in a previous print job is large, the predetermined period of time may be set to be relatively long. As described above, configuration may be taken such that the CPU 200 acquires the number of sheets for which image formation was performed in a previous print job from image formation history, determines the predetermined period of time based on the number of sheets for which image formation was performed, and then determines the temperature condition based on the predetermined period of time. In a case where the temperature condition is not fulfilled, the CPU 200 does not acquire the temperature T. Meanwhile, in a case where the temperature condition is fulfilled, the CPU 200 advances to step S602.

In step S602, the CPU 200 (the barometric pressure estimation unit 205) acquires the temperature T based on the detection result of the temperature sensor 40. In step S603, the CPU 200 (the Va computation unit 201) drives the ultrasonic sensor 31 and then acquires the reception level Va for when the sheet P is not passing through the ultrasonic sensor 31.

In step S604, the CPU 200 (the barometric pressure estimation unit 205) computes the barometric pressure A using the reference barometric pressure A0, the reference temperature T0, the reference reception level Va0, the temperature T, and the reception level Va. For example, the barometric pressure estimation unit 205 acquires the reference barometric pressure A0, the reference temperature T0, and the reference reception level Va0 by reading them out from the storage unit 210. Furthermore, the barometric pressure estimation unit 205 obtains the barometric pressure A by substituting these parameters into expression (6).

In step S605, the CPU 200 determines whether a print instruction has been inputted by the user. The CPU 200 waits here until a print instruction is inputted. When a print instruction is inputted, the CPU 200 advances to step S606.

In step S606, the CPU 200 (the condition control unit 206) determines image forming conditions based on the barometric pressure A. The condition control unit 206 obtains a limit value Vmax using expression (7) and then determines a developing voltage so as to be the limit value Vmax or less. Also, the condition control unit 206 determines the charging voltage Vd using expression (9). Then, the CPU 200, by controlling the image forming apparatus 1 in accordance with the print job and the image forming conditions, forms an image on the sheet P.

Furthermore, the CPU 200 (the condition control unit 206) determines the image forming conditions (e.g., fixing conditions) based on grammage. As described above, the CPU 200 obtains the IR value using the sheet discrimination device 30, computes grammage based on the IR value, and then determines the fixing conditions based on the grammage.

According to the first embodiment, the barometric pressure A is accurately estimated based on the reference barometric pressure A0, the reference temperature T0, the reference reception level Va0, the temperature T, and the reception level Va. Here, the temperature T is acquired by the temperature sensor 40; however, the temperature sensor 40 is a sensor for other purposes (e.g., acquiring the outside air temperature, the fixing temperature, and the temperature of the exposure device 13). Accordingly, a temperature sensor dedicated for acquiring the barometric pressure A is unnecessary. Also, an atmospheric pressure sensor for measuring the barometric pressure A is unnecessary. Accordingly, it becomes possible to acquire the barometric pressure A at a low cost. Note that the reception level Va that becomes necessary for estimating the barometric pressure A can be acquired by the ultrasonic sensor 31 provided in the sheet discrimination device 30. Accordingly, an ultrasonic sensor dedicated for acquiring the barometric pressure A is unnecessary. Accordingly, it becomes possible to acquire the barometric pressure A at a low cost. Furthermore, the image forming conditions are controlled based on the barometric pressure A; therefore, image quality improvement is achieved at various barometric pressures. Image quality improvement, for example, is to be able to form, on the sheets P, higher density toner images.

Second Embodiment

In the first embodiment, the barometric pressure A is estimated using the ultrasonic sensor 31 for discriminating the type of sheet P. In the second embodiment, the barometric pressure A is estimated using an ultrasonic sensor for determining double feeding of sheets P. In other words, the method itself of estimating barometric pressure is the same in the first embodiment and the second embodiment. Between the first embodiment and the second embodiment, the purpose of the ultrasonic sensor 31 for acquiring the reception level is merely different. In the second embodiment, the type of sheet P may be set by the user.

[Image Forming Apparatus]

Figure 7:
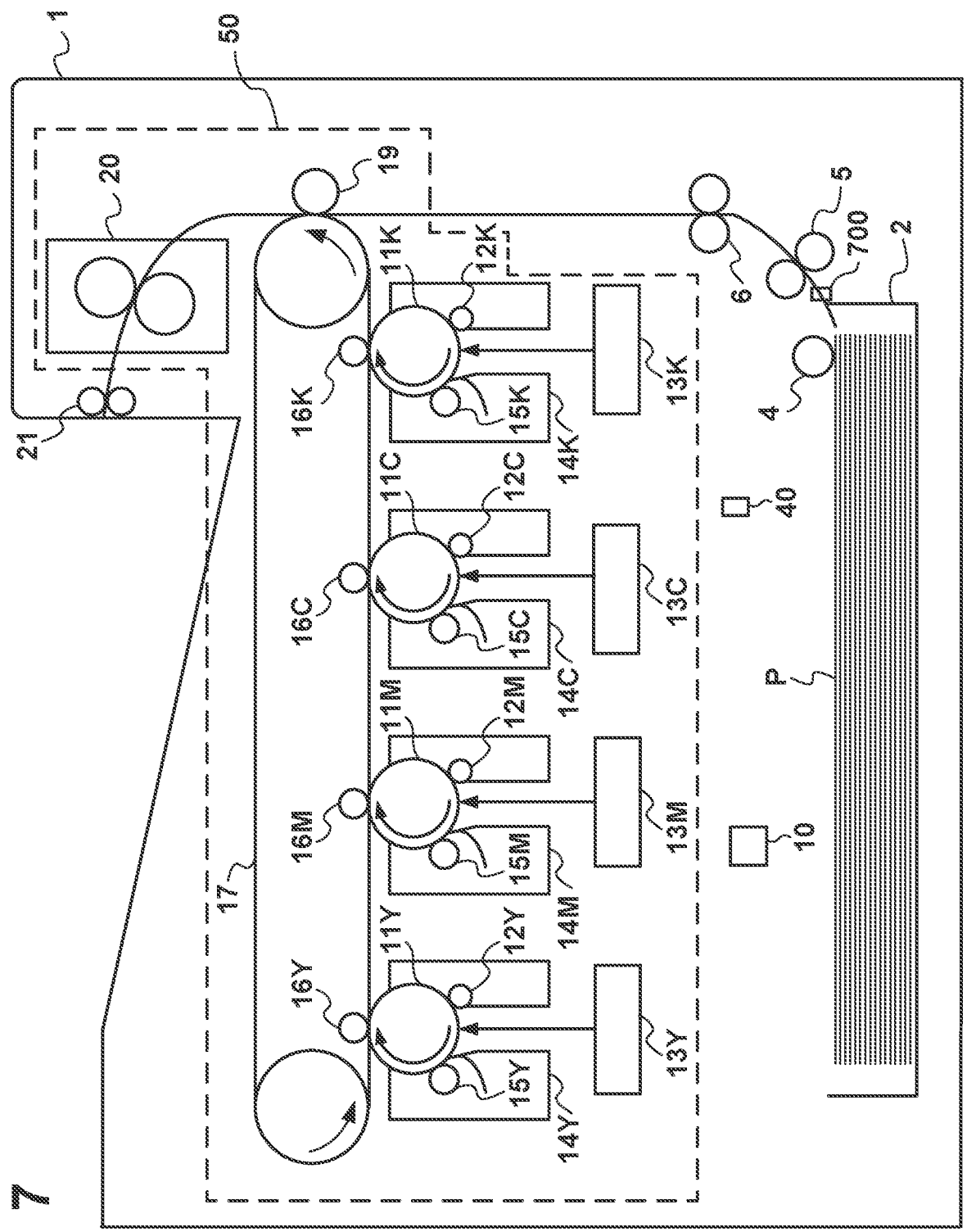
FIG. 7 is a view illustrating the image forming apparatus.

FIG. 7 illustrates the image forming apparatus 1 of the second embodiment. In the second embodiment, the same reference numerals have been assigned for matters common to the first embodiment, and the description thereof will be invoked. As illustrated in FIG. 7, in the second embodiment, a double feed discrimination device 700 is provided on a downstream side than the sheet feeding roller 4 and on an upstream side than the conveyance rollers 5. There are cases where two or more sheets P are fed from the sheet feeding cassette 2. This phenomenon is called double feeding. Normally, sheet P is transferred to the conveyance rollers 5 one by one. When the double feed discrimination device 700 detects double feeding, the CPU 200 causes the sheet feeding roller 4, the conveyance rollers 5 and the like to stop.

[Detecting Double Feeding]

Figure 8:
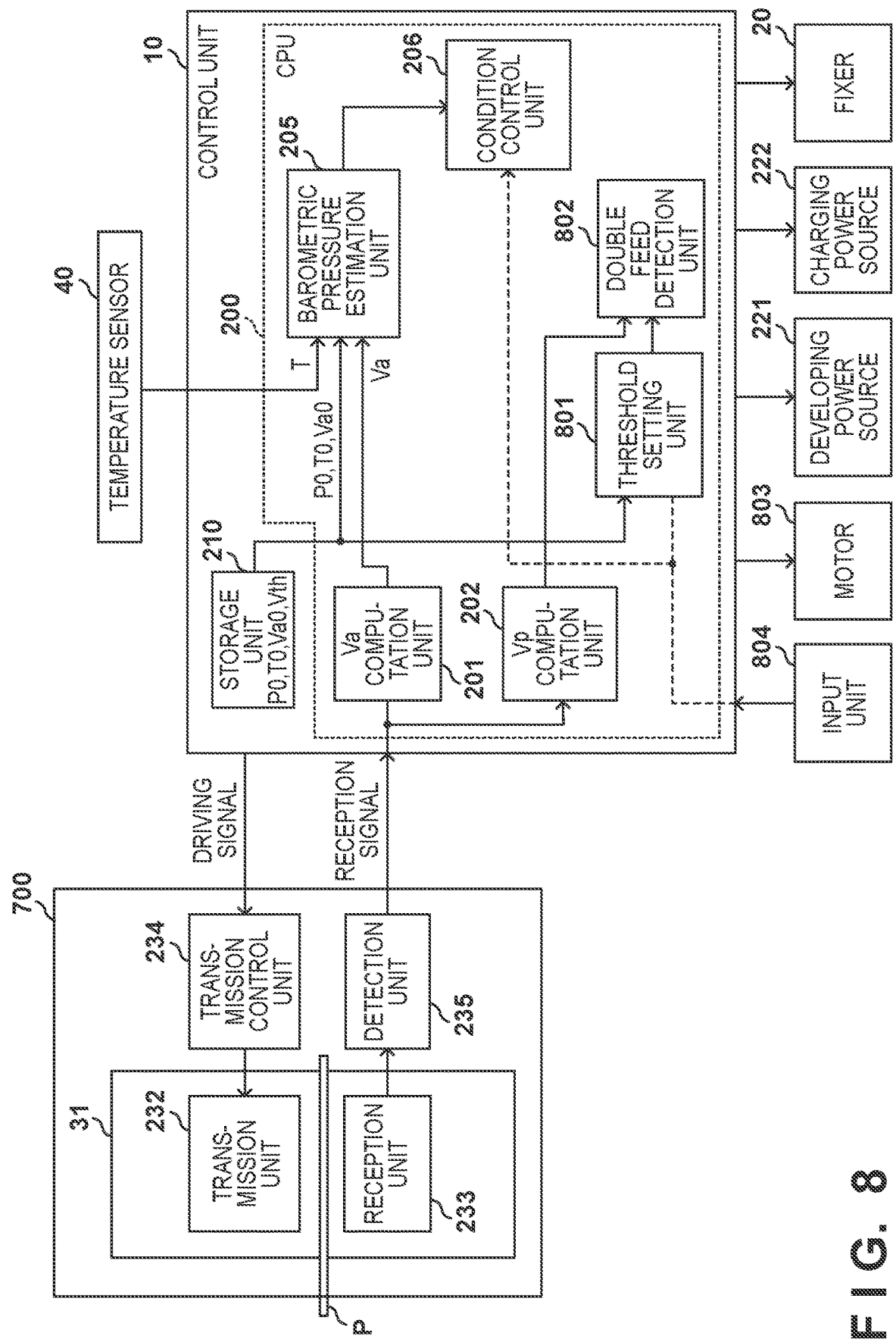
FIG. 8 is a view illustrating a double feed determination device.

FIG. 8 illustrates the double feed discrimination device 700 and the control unit 10. The double feed discrimination device 700 is quite similar to the sheet discrimination device 30 and is different only in that the frequency of sound waves is 300 kHz. The second embodiment is common to the first embodiment in that the number of pulses is two and in detecting the peak value of the second waveform. The barometric pressure A is estimated using the reception level of the reception signal outputted from the double feed discrimination device 700 instead of the sheet discrimination device 30. Also, in the second embodiment, the image forming conditions (fixing conditions) is determined based on the type information (grammage) of the sheet P inputted by the user and the like. Accordingly, in the second embodiment, the IR computation unit 203 and the grammage computation unit 204 can be omitted.

The CPU 200 has a threshold setting unit 801 and a double feed detection unit 802. The threshold setting unit 801 determines the threshold value Vth in consideration of the sheet type (e.g., grammage) of sheet P and then sets it in the double feed detection unit 802. The sheet type (e.g., grammage) of sheet P may be, for example, inputted by the user from an input unit 804. When the double feed detection unit 802 detects double feeding based on the threshold value Vth and the reception level Vp, the CPU 200 stops a motor 803. The motor 803 is a motor that drives the sheet feeding roller 4 and the conveyance rollers 5. The threshold value Vth is determined so as to fulfill expression (10).

$$Vp\text{double} < Vth < Vp\text{single} \tag{10}$$

Here, Vpsingle is a reception level in a case where a single sheet P is being conveyed (single feeding) in the ultrasonic sensor 31. Vpdouble is a reception level in a case where two sheets P are being conveyed (double feeding) in the ultrasonic sensor 31. The reception level Vpdouble at the time of double feeding is small compared to the reception level Vpsingle at the time of single feeding. This is because as the number of overlapping sheets P increases, the amount of attenuation of ultrasonic waves increases and the reception level decreases. Accordingly, the threshold value Vth is set between the reception level Vpdouble at the time of double feeding and the reception level Vpsingle at the time of single feeding.

Figure 9:
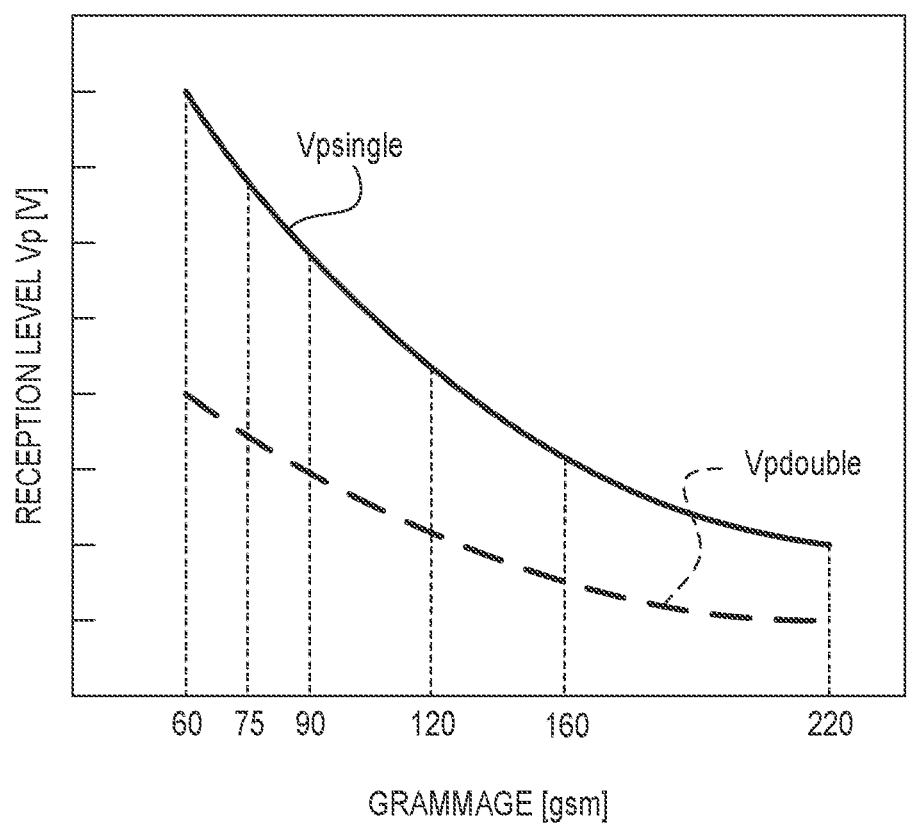
FIG. 9 is a view illustrating a reception level related to grammage.

FIG. 9 illustrates an example of the relationship between the grammage of the sheet P and the reception levels Vpsingle and Vpdouble. The vertical axis represents the reception level. The horizontal axis represents grammage. The reception levels Vpsingle and Vpdouble decrease in accordance with an increase in the grammage of the sheet P. The reception level Vpdouble at the time of double feeding is approximately half of the reception level Vpsingle at the time of single feeding. This is because the thickness of sheet P at the time of double feeding is twice the thickness of sheet P at the time of single feeding. In a case where there is a layer of air between two sheets P at the time of double feeding, the reception level further decreases.

As illustrated in FIG. 9, the reception levels Vpsingle and Vpdouble decreases as grammage increases. Assume that an intermediate value between Vpsingle and Vpdouble when the grammage is 120 gsm is fixed as the threshold value Vth. In such a case, the reception level Vpsingle of a sheet P whose grammage is greater than 120 gsm will be smaller than the threshold value Vth even if the sheet P is a single sheet. This leads to misdetecting double feeding. With a sheet P whose grammage is smaller than 120 gsm, there are cases where Vpdouble exceeds Vth. In such a case, in spite of the fact that double feeding of sheets P is actually occurring, it is misdetected as single feeding.

Accordingly the threshold value Vth needs to be appropriately set in accordance with the sheet type (grammage) of sheet P. For example, the user selects the sheet type of sheet P via the input unit 804 (an external device such as a display panel comprised in the image forming apparatus 1 or a personal computer connected to the image forming apparatus 1). In the storage unit 210, various sheet types of sheet P and the corresponding appropriate thresholds Vth are stored. The threshold setting unit 801 reads out from the storage unit 210 the threshold value Vth corresponding to the inputted sheet type (grammage) and then sets it in the double feed detection unit 802.

The threshold value Vth is determined based on an experiment or a simulation. For example, grammages of various sheet types of sheet P are measured using an electronic scale. Also, regarding the various sheet types of sheet P, the reception level at the time of single feeding and the reception level at the time of double feeding are measured. The threshold values Vth are determined so as to fulfill expression (10) for each grammage, and the threshold values Vth are associated with grammages (sheet types) and then stored in the ROM region of the storage unit 210. The threshold value Vth may be further adjusted considering the page variability in the grammage of the sheets P, the variability of electric components constituting the double feed discrimination device 700, and the like. The page variability means that the grammage is not uniform even if the sheet P is a single sheet.

According to the second embodiment, the barometric pressure A is estimated using the ultrasonic sensor 31 for detecting double feeding. Accordingly, it becomes possible to accurately acquire barometric pressure with a relatively inexpensive configuration. Furthermore, the image forming conditions are controlled based on the barometric pressure A; therefore, image quality improvement is achieved at various barometric pressures.

Technical Ideas Derived from Exemplary Embodiments

[Aspect 1]

The ultrasonic sensor 31 is an example of an ultrasonic sensor provided in the image forming apparatus 1. The CPU 200 is an example of a control unit that controls the image forming apparatus 1 based on an output signal of the ultrasonic sensor 31. The barometric pressure estimation unit 205 is an example of an estimation unit that estimates barometric pressure based on an output signal of the ultrasonic sensor 31. The condition control unit 206 is an example of a decision unit that determines image forming conditions based on the barometric pressure estimated by the estimation unit. As described in the first and second embodiments, the ultrasonic sensor 31 is utilized for controlling the image forming apparatus 1 (first purpose) and for estimating barometric pressure (second purpose). Accordingly, it becomes possible to accurately acquire barometric pressure with a relatively inexpensive configuration.

[Aspect 2]

As described in the first embodiment, the grammage computation unit 204 may function as a discrimination unit that discriminates the type of sheet based on the output signal outputted from the ultrasonic sensor in a period in which a sheet is passing through the ultrasonic sensor. In such a case, the ultrasonic sensor 31 is to be utilized for discriminating the type of sheet and for estimating barometric pressure. The period in which a sheet is passing through the ultrasonic sensor refers to a period in which there is a sheet between a transmission unit and a reception unit. The period in which a sheet is not passing through the ultrasonic sensor refers to a period in which there is no sheet between a transmission unit and a reception unit.

[Aspect 3]

As described in the second embodiment, the double feed detection unit 802 may function as a detection unit that detects double feeding of sheets based on the output signal outputted from the ultrasonic sensor 31 in the period in which a sheet is being conveyed in the ultrasonic sensor 31. In such a case, the ultrasonic sensor 31 is to be utilized for detecting double feeding of sheets and for estimating barometric pressure.

[Aspect 4]

The temperature sensor 40 functions as an acquisition unit that acquires temperatures (e.g., a fixing temperature and an outside air temperature) related to the image forming apparatus 1. The storage unit 210 stores a reference barometric pressure and a reference temperature acquired in advance. Furthermore, the storage unit 210 stores a reference level, which is a level of an output signal outputted from the ultrasonic sensor in the period in which a sheet is not passing through the ultrasonic sensor. The barometric pressure estimation unit 205 estimates barometric pressure based on the temperature acquired by the acquisition unit, the level of the output signal outputted from the ultrasonic sensor in the period in which a sheet is not passing through the ultrasonic sensor, and information read out from the storage unit. This information is, for example, the reference barometric pressure, the reference temperature, and the reference level. As described above, by using the parameters acquired under a known or reference environment, it becomes possible to estimate barometric pressure more accurately.

[Aspect 5]

As described in relation to expression (6), the storage unit 210 may further store a function or table for estimating barometric pressure. The barometric pressure estimation unit 205 may estimate barometric pressure by applying this function or table. In the function or table, the temperature acquired by the acquisition unit, the level of the output signal outputted from the ultrasonic sensor in the period in which a sheet is not passing through the ultrasonic sensor, and the reference barometric pressure, the reference temperature, and the reference level read out from the storage unit are adopted.

[Aspect 6]

The temperature sensor 40 may be a temperature sensor that detects an outside air temperature of the image forming apparatus or a temperature of the fixing unit of the image forming apparatus. By this, a temperature sensor dedicated for estimating barometric pressure becomes unnecessary and it should become possible to estimate barometric pressure at a lower cost.

[Aspect 7]

As described in relation to step S601, the CPU 200 may function as a determination unit that determines whether a permission condition (e.g., a temperature condition) under which to permit the estimation unit to estimate barometric pressure is fulfilled. The barometric pressure estimation unit 205, in a case where the permission condition is fulfilled, executes the estimation of barometric pressure, and in a case where the permission condition is not fulfilled, does not execute the estimation of barometric pressure. By this, it becomes possible to estimate barometric pressure more accurately.

[Aspects 8 and 9]

The permission condition may be that a difference in a temperature of temperature sensor and a temperature of the ultrasonic sensor is a predetermined threshold or less. The predetermined threshold is determined by executing an experiment or a simulation in advance so as to achieve required accuracy of the estimation of barometric pressure. This may be replaced by that an elapsed time from a timing when previous image formation was ended is a predetermined period of time or more. The permission condition may be that the period of time in which the image forming apparatus 1 has not formed an image is a predetermined period of time or more. The predetermined period of time is determined by executing an experiment or a simulation in advance so as to achieve required accuracy of the estimation of barometric pressure. Note that the measuring of time may be executed by an RTC (real-time clock), a counter circuit, or the like that the CPU 200 comprises.

[Aspects 10 and 13]

As described in the first embodiment, the CPU 200 may determine a first image forming condition based on the type of sheet discriminated by the discrimination unit. The CPU 200 may be configured so as to determine a second image forming condition based on barometric pressure. For example, the first image forming condition may include a fixing condition of the fixing unit provided in the image forming apparatus 1. For example, the second image forming condition may include a developing voltage or a charging voltage of the image forming apparatus 1.

[Aspect 11]

The input unit 804 functions as a selection unit that accepts selection of the type of sheet. The CPU 200 may determine the first image forming condition based on the type of sheet accepted by the selection unit. The CPU 200 may determine the second image forming condition based on barometric pressure.

[Aspect 12]

The threshold setting unit 801 function as a setting unit that sets a detection threshold that is used in the detection unit based on the type of sheet accepted by the selection unit. The double feed detection unit 802 may detect double feeding of sheets based on the detection threshold set by the setting unit and the level of the output signal outputted from the ultrasonic sensor in the period in which a sheet is passing through the ultrasonic sensor.

[Aspect 14]

As illustrated in FIG. 2, the sheet discrimination device 30 and the control unit 10 form a sheet determination device. The ultrasonic sensor 31 is an example of an ultrasonic sensor provided in a conveyance path that conveys a sheet. The grammage computation unit 204 functions as a discrimination unit that discriminates the type of sheet based on the output signal outputted from the ultrasonic sensor 31 in the period in which a sheet is passing through the ultrasonic sensor 31. The barometric pressure estimation unit 205 functions as an estimation unit that estimates barometric pressure based on the output signal outputted from the ultrasonic sensor 31 in the period in which a sheet is not being conveyed in the ultrasonic sensor 31. The ultrasonic sensor 31 is to be utilized for discriminating the type of sheet and for estimating barometric pressure.

[Aspect 15]

As illustrated in FIG. 8, the double feed discrimination device 700, the control unit 10, and the like form a double feed determination device. The double feed detection unit 802 functions as a detection unit that detects double feeding of sheets based on the output signal outputted from the ultrasonic sensor in the period in which a sheet is passing through the ultrasonic sensor. The barometric pressure estimation unit 205 functions as an estimation unit that estimates barometric pressure based on the output signal outputted from the ultrasonic sensor 31 in the period in which a sheet is not passing through the ultrasonic sensor 31. The ultrasonic sensor 31 is to be utilized for discriminating double feeding of sheets and for estimating barometric pressure.

[Aspect 16]

As derived from the first and second embodiments, the present invention provides a barometric pressure estimation apparatus. The ultrasonic sensor 31 is an example of an ultrasonic sensor provided for a first purpose that is different from a second purpose of estimating barometric pressure. The CPU 200 functions as a control unit that controls electronic equipment for the first purpose based on the output signal outputted from the ultrasonic sensor 31. The image forming apparatus 1, the sheet determination device, a double feed determination device, and the like are an example of the electronic equipment. In such a case, the first purpose may be to determine an image forming condition, determine the type of sheet (e.g., grammage), or determine double feeding of sheets. The barometric pressure estimation unit 205 functions as an estimation unit that estimates barometric pressure for the second purpose (e.g., estimating barometric pressure) based on the output signal outputted from the ultrasonic sensor 31.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-090825, filed May 25, 2020 which is hereby incorporated by reference herein in its entirety.

What is claimed is:

1. An image forming apparatus, comprising:
an ultrasonic sensor;
a processor configured to control the image forming apparatus based on an output signal of the ultrasonic sensor;
an acquisition circuit configured to acquire a temperature related to the image forming apparatus; and
a storage device configured to store a reference barometric pressure and a reference temperature acquired in advance and a reference level that is a level of the output signal output from the ultrasonic sensor in a period in which a sheet is not passing through the ultrasonic sensor,
wherein the processor is configured to estimate a barometric pressure based on the temperature acquired by the acquisition circuit, the level of the output signal output from the ultrasonic sensor in the period in which the sheet is not passing through the ultrasonic sensor, the reference barometric pressure, the reference temperature, and the reference level read out from the storage device, and determine an image forming condition based on the estimated barometric pressure, and
the ultrasonic sensor is utilized for controlling the image forming apparatus and for estimating the barometric pressure.

2. The image forming apparatus according to claim 1, wherein the processor is further configured to discriminate a type of a sheet based on the output signal outputted from the ultrasonic sensor in a period in which the sheet is passing the ultrasonic sensor, and
the ultrasonic sensor is utilized for discriminating the type of the sheet and for estimating the barometric pressure.

3. The image forming apparatus according to claim 2, wherein the processor is further configured to determine a first image forming condition based on the discriminated type of the sheet and determine a second image forming condition based on barometric pressure.

4. The image forming apparatus according to claim 3, wherein the first image forming condition includes a fixing condition of a fixer provided in the image forming apparatus, and
the second image forming condition includes a developing voltage or a charging voltage of the image forming apparatus.

5. The image forming apparatus according to claim 1, wherein the processor is further configured to detect double feeding of a sheet based on the output signal outputted from the ultrasonic sensor in a period in which the sheet is passing the ultrasonic sensor, and
the ultrasonic sensor is utilized for detecting double feeding of the sheet and for estimating the barometric pressure.

6. The image forming apparatus according to claim 5, wherein the processor is further configured to accept selection of the type of the sheet, determine a first image forming condition based on the accepted type of the sheet, and determine a second image forming condition based barometric pressure.

7. The image forming apparatus according to claim 6, wherein the processor is further configured to set a detection threshold to be used for detecting the double feeding of the sheet based on the accepted type of sheet and detect the double feeding of the sheet based on the set detection threshold and a level of the output signal outputted from the ultrasonic sensor in the period in which the sheet is passing the ultrasonic sensor.

8. The image forming apparatus according to claim 1, wherein the storage device further stores a function or a table for estimating the barometric pressure, and
the processor is configured to estimate the barometric pressure by applying, in the function or the table the temperature acquired by the acquisition circuit, the level of the output signal outputted from the ultrasonic sensor in the period in which the sheet is not passing through the ultrasonic sensor, and the reference barometric pressure, the reference temperature, and the reference level read out from the storage device.

9. The image forming apparatus according to claim 1, wherein the acquisition circuit includes a temperature sensor that detects an outside air temperature of the image forming apparatus or a temperature of a fixing unit of the image forming apparatus.

10. The image forming apparatus according to claim 9, wherein the processor is configured to determine whether a permission condition under which to permit to estimate the barometric pressure is fulfilled, and the processor is configured to, in a case where the permission condition is fulfilled, execute the estimation of the barometric pressure, and in a case where the permission condition is not fulfilled, not execute the estimation of the barometric pressure.

11. The image forming apparatus according to claim 10, wherein the permission condition includes that a difference in a temperature of temperature sensor and a temperature of the ultrasonic sensor is a predetermined threshold or less.

12. The image forming apparatus according to claim 10, wherein the permission condition includes that a period of time in which the image forming apparatus has not formed an image is a predetermined period of time or more.

13. A sheet determination apparatus comprising:
an ultrasonic sensor configured to be provided in a conveyance path that conveys sheet;
an acquisition circuit configured to acquire a temperature related to the sheet determination apparatus;
a storage device configured to store a reference barometric pressure and a reference temperature acquired in advance and a reference level that is a level of the output signal outputted from the ultrasonic sensor in a period in which a sheet is not passing through the ultrasonic sensor; and
a processor configured to discriminate a type of the sheet based on an output signal outputted from the ultrasonic sensor in a period in which the sheet is passing through the ultrasonic sensor and estimate a barometric pressure based on the temperature acquired by the acquisition circuit, the level of the output signal outputted from the ultrasonic sensor in the period in which the sheet is not passing through the ultrasonic sensor, the reference barometric pressure, the reference temperature, and the reference level read out from the storage device,
wherein the ultrasonic sensor is utilized for discriminating the type of the sheet and for estimating the barometric pressure.

14. A sheet double-feed detection apparatus, comprising:
an ultrasonic sensor provided in a conveyance path that conveys a sheet;
an acquisition circuit configured to acquire a temperature related to the sheet determination apparatus;
a storage device configured to store a reference barometric pressure and a reference temperature acquired in advance and a reference level that is a level of the output signal outputted from the ultrasonic sensor in a period in which a sheet is not passing through the ultrasonic sensor; and
a processor configured to detect double feeding of the sheet based on an output signal outputted from the ultrasonic sensor in a period in which the sheet is passing through the ultrasonic sensor and estimate a barometric pressure based on the temperature acquired by the acquisition circuit, the level of the output signal outputted from the ultrasonic sensor in the period in which the sheet is not passing through the ultrasonic sensor, and the reference barometric pressure, the reference temperature, and the reference level read out from the storage device,
wherein the ultrasonic sensor is utilized for discriminating double feeding of the sheet and for estimating the barometric pressure.

15. A barometric pressure estimation apparatus, comprising:
an ultrasonic sensor provided for a first purpose that is different from a second purpose of estimating a barometric pressure;
an acquisition circuit configured to acquire a temperature related to electronic equipment;
a storage device configured to store a reference barometric pressure and a reference temperature acquired in advance and a reference level that is a level of the output signal outputted from the ultrasonic sensor in a period in which an object is not passing through the ultrasonic sensor; and
a processor configured to control electronic equipment for the first purpose based on an output signal outputted from the ultrasonic sensor,
wherein the processor is configured to estimate the barometric pressure for the second purpose based on the temperature acquired by the acquisition circuit, the level of the output signal outputted from the ultrasonic sensor in the period in which the object is not passing through the ultrasonic sensor, the reference barometric pressure, the reference temperature, and the reference level read out from the storage device.

* * * * *